United States Patent
Gilde et al.

(10) Patent No.: US 7,163,656 B1
(45) Date of Patent: Jan. 16, 2007

(54) METHOD FOR MAKING DENSE POLYCRYSTALLINE ALUMINUM OXYNITRIDE

(75) Inventors: Gary A. Gilde, Northeast, MD (US); Parimal J. Patel, Bel Air, MD (US); Jerry C. Lasalvia, Belcamp, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 452 days.

(21) Appl. No.: 10/146,945

(22) Filed: May 17, 2002

(51) Int. Cl.
 *B28B 3/00* (2006.01)
(52) U.S. Cl. ...................... 264/667; 264/668
(58) Field of Classification Search ............... 264/662, 264/663, 667, 668; 423/355, 409, 592.1, 423/600, 624, 625
 See application file for complete search history.

(56) References Cited

U.S. PATENT DOCUMENTS

| | | | |
|---|---|---|---|
| 3,572,992 A * | 3/1971 | Inoue et al. | 423/412 |
| 4,241,000 A | 12/1980 | McCauley et al. | 264/65 |
| 4,481,300 A | 11/1984 | Hartnett et al. | 501/152 |
| 4,520,116 A | 5/1985 | Gentilman et al. | 501/98 |
| 4,585,706 A * | 4/1986 | Takeda et al. | 428/620 |
| 4,686,070 A | 8/1987 | Maguire et al. | 264/1.2 |
| 4,720,362 A | 1/1988 | Gentilman et al. | 264/1.2 |
| 5,231,062 A * | 7/1993 | Mathers et al. | 501/96.1 |
| 5,908,796 A * | 6/1999 | Pujari et al. | 501/97.1 |

* cited by examiner

*Primary Examiner*—Carlos Lopez
(74) *Attorney, Agent, or Firm*—William Randolph

(57) ABSTRACT

A dense polycrystalline aluminum oxynitride body is produced. According the method of production, aluminum oxide (alumina) powder and 26 to 40 mole % aluminum nitride powder is mixed to form a very fine powder mixture. The powder mixture is shaped and hot pressed at a moderate temperature, preferably about 1600° C., which is below the temperature of aluminum oxynitride (AlON) formation to produce a dense intermediate body. The dense intermediate body is reacted to produce a highly dense polycrystalline aluminum oxynitride body. The dense body is particularly useful for ballistic armor.

25 Claims, No Drawings

METHOD FOR MAKING DENSE POLYCRYSTALLINE ALUMINUM OXYNITRIDE

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The invention relates to a method for shaping or treating a ceramic body including plural heating steps. More particularly the invention relates to a method for forming a polycrystalline aluminum oxynitride product. Most particularly, the invention relates to the formation of an aluminum oxynitride powder and a method for making the powder which provides better powder density, transparency, uniformity, reduced processing costs and equipment damage.

2. Discussion of the Related Art

The invention relates to the technology of making very dense ceramic materials. Certain ceramic materials have been used as ballistic armor. Any material used in this capacity must have certain physical properties in order to defeat a small arms projectile. Such a material must have a very hard face surface and be very dense. Polycrystalline aluminum oxynitride can be made to have these essential physical properties when made according to methods, which achieve this objective.

Polycrystalline aluminum oxynitride (AlON) are important ceramic materials used in making ballistic armor, bearings, and light transmitting envelopes. These materials can be used to replace current armors because of their increased mechanical and thermal shock resistance (see Martin et al., Synthesis and Hot Pressing of Transparent Aluminum Oxynitride, Window and Dome Technologies and Materials, SPIE Vol 1112, 1989). However, AlONs are limited from wide use because of manufacturing difficulties, particularly in making armor plate of the size and shape required and in the high manufacturing cost associated with large ceramic plate which must be free of flaws.

U.S. Pat. No. 4,241,000 to MCCauley et al. incorporated herein by reference, teach single phase (spinel) polycrystalline, cubic aluminum oxynitrides having isotropic optical, thermal, and electrical properties, which are physically and chemically stable at temperatures up to 1100° C. The method includes isostatic pressing $Al_2O_3$ and AlN, at 25,000 psi, and heat treating the compacted mixture at 1200° C. for 24 hours followed by a sintering step at temperatures above 2000° C.

U.S. Pat. No. 4,481,300 to Hartnett et al. and U.S. Pat. No. 4,686,070 to Maguire et al disclose polycrystalline doped cubic aluminum oxynitride materials and methods of forming AlON materials utilizing isostatic pressing.

While the above processes appear to provide AlON plates of up to 98% density, they have been inconsistent in providing the quality required for ballistic armors and the like. Additionally, these processes have been limited by the cost of manufacture and variation in product quality. Note that isostatic pressing involves placing a dry or semidry granulated ceramics mixture in a polymer mold and then uniformly pressing the mold while immersed in a high pressure oil or water cylinder (see Jones et al., "Ceramics, The Iowa State University Press, AMGS, 1972, pp. 52–61). The severe conditions associated with hydraulic systems and contamination of the dies is a major reason for the high cost of manufacture as well as for a notable product rejection rate.

U.S. Pat. No. 4,720,362 to Gentilman et al. disclose hot pressed cubic aluminum oxynitrides which provide transparent ceramic materials suitable for missile domes. Here, the powders are ball-milled with methanol, dried and calcined in a nitrogen atmosphere. The process forms aluminum oxynitride which is then ball milled with methanol to provide a single phase aluminum oxynitride powder. Boron and yttrium oxide may also be added as doping agents.

Hot pressing is a well known process for making ceramic powders having increased densities which are formed at relatively lower temperatures and shorter cycle times (see Martin et al, above). However, hot pressing is restrictive because unidirectional or bidirectional external pressures are required during processing. This leads to increased equipment costs particularly in tool wear and operation due to the high temperature and pressure conditions under which they are utilized (see Engineered Materials Handbook, Vol. 4, Ceramics and Glasses, pp 186–192).

The present invention overcomes the disadvantages of the prior methods of producing polycrystalline aluminum oxynitride (AlON) powders by providing a process for making AlONs that utilizes the benefits of hot pressing including short furnace cycle times, high product density and little green body preparation, without the shortcomings: tool wear and high operation costs.

SUMMARY OF THE INVENTION

It is, therefore, an objective of the present invention to provide a method of producing polycrystalline aluminum oxynitride (AlON) powders that are consistently and uniformly dense and economically produced.

It is also an objective of the present invention to provide a method of making AlONs that utilizes heating aluminum oxide and aluminum nitride precursors at temperatures less than 1600° C. to reduce furnace and hydraulic wear.

It is yet another objective of the present invention to provide a method of making AlONs that allows for easy reproducibility of parts.

In accordance with these objectives, the present invention is directed to a method for preparing dense, polycrystalline aluminum oxynitride (AlONs). The precursor fine-grained powders include aluminum oxide ($Al_2O_3$) and 26 mole % to 40 mole % aluminum nitride (AlN) which are mixed and formed into a green body. The green body is uniaxially pressed at a moderate temperature. Uniaxial pressing conditions include a pressure of about 3,000 psi to 10,000 psi and a temperature of about 1350° C. to 1600° C. for a time period of 1 hour to 4 hours. This temperature is below the reaction temperature. The result is a hot pressed intermediate body. The hot pressed intermediate body is reacted at reaction conditions in an oxygen-free atmosphere. Reaction conditions include a reaction temperature of about 1700° C. to 2000° C., reaction pressure of about 3 psi to 30,000 psi, and a reaction time period of about 1 hour to 12 hours. The reacted body is then cooled at a controlled rate to prevent cracking, which results in a dense AlON product.

The green body is preferably formed for use as ballistic armor. Products made in accordance with the method of this invention are particularly dense and therefore useful for ballistic armor and other applications requiring shielding characteristics.

DETAILED DESCRIPTION OF THE INVENTION

The present invention provides a unique process for making AlON ceramics which utilize the benefits of hot pressing: short furnace cycle time, high density, little green body preparation, while minimizing the disadvantages of hot-pressing at high temperatures: tool wear and costly operation.

Aluminum oxide ($Al_2O_3$) powder and 26 mole % to 40 mole % aluminum nitride (AlN) powder are mixed to form aluminum oxynitrides of the following chemical formula:

$$Al_{(64+x)/3} O_{32-x} N_x \qquad (1)$$

where x is between 2 and 7.

One common aluminum oxynitride composition that is made according to the reaction is $Al_{23}O_{27}N_5$.

Compositions within the scope of the present invention are identified according to stochiometries listed in the table below:

TABLE 1.1

Stochiometries calculated from constant anion spinel model

$$\left( Al_{\frac{64+x}{3}} O_{32-x} N_x \right)$$

| N | O | Al | Interstitials | Vacancies | Mol AlN |
|---|----|-------|------|---|------|
| 11 | 21 | 25.00 | 1.00 | — | 61.1 |
| 10 | 22 | 24.67 | 0.67 | — | 57.7 |
| 9 | 23 | 24.33 | 0.33 | — | 54.0 |
| 8 | 24 | 24.00 | 0 | — | 50.0 |
| 7 | 25 | 23.67 | — | | 45.7 |
| 6 | 26 | 23.33 | — | | 45.7 |
| 5 | 27 | 23.00 | — | | 35.7 |
| 4 | 28 | 22.67 | — | | 30.0 |
| 3 | 29 | 22.33 | — | | 23.7 |
| 2 | 30 | 22.00 | — | | 16.7 |
| 1 | 31 | 21.67 | — | | 8.8 |
| 0 | 32 | 21.33 | — | | 0 |

Both aluminum oxide powder and aluminum nitride powder are commercially available in fine-grained form suitable for use in making ceramics. Aluminum oxide (alumina) is commercially available as a fine-grained powder having a purity of at least 99.98% and an average particle size of 0.1 to 2 micrometers. Aluminum nitride is commercially available as a fine-grained powder having a purity of at least 99.98% and an average particle size of 0.1 to 2 micrometers. A quantity of aluminum oxide is weighed and placed in a mixer. To this is added a 10 weighed amount of aluminum nitride. The aluminum nitride is added in an amount so that the combined powder is 60 to 74 mole % aluminum oxide and 26 to 40 mole % aluminum nitride.

Optionally, an aid to reaction may be added. A reaction aid is an additional inorganic compound that increases the rate or extent of densification or consolidation during reaction. The reaction aid is added in an effective amount, not to exceed 0.50 weight percent of the powder mixture. Examples of reaction aids include rare earth elements, lanthanum, boron and lithium fluoride. Preferably these materials are used in their oxide state such as yttrium oxide ($Y_2O_3$) and lanthanum oxide ($La_2O_3$). A combination of reaction aids may be used, so long as the total amount does not exceed 0.50 weight percent of the total powder mixture. Reaction aides are also known in the art as sintering aids or doping additives.

Mixing is carried out, by way of example, in an alumina ball mill using high alumina balls. The powders are ball milled dry or in a fluid medium. Milling fluids include, by way of example, an alcohol such as methanol or ethanol, a ketone such as acetone, trichloroethane, toluene, a xylene, hexane, and function equivalents thereof and compatible mixtures thereof. Mixing for a period of time in the range of 8 hours to 48 hours produces an intimately mixed powder. The milled powder is passed through a 400 mesh sieve and is dried at 65° C. for up to 24 hours. The result is a homogeneous, fine-grained powder mixture having particles in the range of 0.5 to S microns.

Uniaxial pressing is carried out by forming the powder mixture in a rigid, shaped die. Pressure is applied to the powder in a single axial direction by a rigid punch or piston. The press is typically a mechanical or a hydraulic press.

The aluminum oxide/aluminum nitride mixture is placed in a shaped graphite die and compacted. Compacting is by uniaxial pressing at a pressure of about 1000 psi to 3,000 psi. Uniaxial pressing temperature is about 1350° C. up to about 1600° C. but not including reaction temperatures which start at about 1620° C. and includes higher temperatures. Uniaxial pressing temperature is preferably about 1400° C. to about 1600° C. Uniaxial pressing duration is about 1 hour to 4 hours. The compressed mixture/part is then cooled to room temperature (ambient) at a rate which prevents cracking. This rate is preferably 5° C./minute. The result is a hot pressed intermediate body.

Uniaxial pressing involves applying pressure to a sample from a single direction. The application of unidirectional pressure is limited by, inter alia, die wall friction and pressure distribution within the sample. Accordingly, the length to diameter ratio of the sample must be limited to relative low values. Uniaxial pressing dies and presses are commercially available and techniques for their use are well known. Therefore, uniaxial pressing can be carried out on samples without experimentation.

When the compacting is completed, the intermediate body is loaded into an annealing furnace and heated in an oxygen-free atmosphere of, e.g. 1 to 2 atmospheres flowing nitrogen, at a reaction temperature of 1700° C. to 2000° C. for about one hour up to twelve hours. A heating time of two to eight hours produces a dense, polycrystalline aluminum oxynitride.

It is known in the art to react at temperatures up to 2025° C. and higher. However, reaction temperatures above 2000° C. permit formation of an included liquid phase and the creation of voids as the liquid is vaporized during reaction. For this reason, it is critical that reaction be carried out at a temperature of 2000° C. or less in order to attain the densest polycrystalline product possible. It has been found in the laboratory that densities of 99.99 percent of theoretical density are achievable.

When reaction is completed, the furnace temperature is lowered at a controlled rate of about 5° C./minute, preferably 1 to 5° C./minute to ambient temperature in order to prevent cracking. The product is a shaped polycrystalline aluminum oxynitride body. The body is dense, and essentially free of voids, irregular grain boundaries or other flaws.

The present invention relies on hot uniaxial pressing of the precursor powders at temperatures below reaction temperature prior to reaction in contrast to the prior art, which uses pressing at reaction temperatures. The inventive method achieves a product of the highest quality at less severe processing conditions. This reduces furnace heat requirements, reduces furnace wear and down time and reduces degradation of the die and the hot press hydraulic system. This results in a significant cost advantage for the instant process over those processes of the prior with no reduction in product quality. The data shows that the instant method yields a product having a density equal to theoretical density. The product is useful as ballistic armor.

EXAMPLE 1

Uniaxial Hot Pressing

We compounded, mixed and compacted $Al_2O_3$/AlN mixtures according to the method of the present invention.

EXAMPLE 1A

A fine-grained mixture of $Al_2O_3$ and AlN powder comprising 64.3 mole % $Al_2O_3$ and 35.7 mole % AlN was divided into seven sample portions. Each of the samples was loaded into a graphite die. The die was heated at a controlled rate of 10~C/minute to the uniaxial pressing temperature recorded in Table 1A-1 and uniaxially pressed at 3000 psi. Each sample was then removed from the die. The following data was recorded (TABLE 1A-2). The data shows there is no reaction until 1700° C. At 1700° C., the x-ray diffraction analysis indicates the formation of AlON. Thus, the limit temperature for hot-pressing is 1600° C. where there is no formation of AlON and the density is the greatest.

TABLE 1A-1

Hot-pressing Conditions

| Sample | Reaction Temperature (° C.) | Reaction Pressure (psi) | Reaction Time (hrs.) |
|---|---|---|---|
| 1 | 1200 | 3000 | 2 |
| 2 | 1300 | 3000 | 2 |
| 3 | 1400 | 3000 | 2 |
| 4 | 1400 | 3000 | 2 |
| 5 | 1500 | 3000 | 2 |
| 6 | 1600 | 3000 | 2 |
| 7 | 1700 | 3000 | 2 |

The resulting six aluminum oxynitride samples were analyzed and the following data recorded:

TABLE 1A-2

Properties of uniaxial hot-pressed samples

| Sample | Uniaxial Pressing Temperature (° C.) | Intermediate Body Phases | Density (g/cm³) | Theoretical Density (g/cm³) | Percent of Theoretical Density | Percent Void Volume |
|---|---|---|---|---|---|---|
| 1 | 1200 | $Al_2O_3$/AlN | 2.56 | 3.82 | 67 | 29.65 |
| 2 | 1300 | $Al_2O_3$/AlN | 3.10 | 3.82 | 81 | 7.26 |
| 3 | 1400 | $Al_2O_3$/AlN | 3.56 | 3.82 | 93 | 1.00 |
| 4 | 1400 | $Al_2O_3$/AlN | 3.60 | 3.82 | 94 | 0.50 |
| 5 | 1500 | $Al_2O_3$/AlN | 3.78 | 3.82 | 99 | 0.00 |
| 6 | 1600 | $Al_2O_3$/AlN | 3.82 | 3.82 | 99.9 | 0.00 |
| 7 | — | AlON | — | — | — | — |

*Composition of Intermediate Body Phases confirmed by x-ray diffraction. Density by Archimedes method according to ASTM C-1259.

Table 1A-2 reports measured densities of identical samples subjected to hot uniaxial pressing at a pressure of 3000 psi and at six different pressing temperatures. The data shows that 1600° C. is a preferred temperature for hot pressing. The data shows that as uniaxial pressing temperature is increased from 1200° C. to 1600° C. the density of the reacted product is increased from 2.56 grams/cubic centimeter to 3.82 grams/cubic centimeter. Uniaxial pressing at a temperature of 1600° C. produced a sample having a measured density equal to theoretical density, calculated by the Rule of Mixtures.

Theoretical density is calculated by multiplying the density of each component material by the mole fraction of each and then summing. The sum is the predicted density of the product aluminum oxynitride. According to the Rule of Mixtures, the density of the $Al_2O_3$/AlN compacted and reacted mixture can have a maximum density of 3.82 gram/cubic centimeter.

Sample 6 provides a preferred reaction condition based on a measured density of 3.82 grams/cubic centimeter, which is 99.9% of its theoretical density. Therefore, this processing condition provides one of the most useful samples for further annealing. Sample 7 had already reacted and is outside the method. It would need to be hot-pressed at much higher temperatures to achieve full density.

Once 1600° C. was determined to be the optimum hot-pressing temperature, several different compositions(Table 1B) were selected to undergo the proposed hot-press/anneal method.

TABLE 1B

Experimental procedure for hot pressing

| Mol % AlN | Weight Percent AlN | Weight Percent $Al_2O_3$ |
|---|---|---|
| 26 | 12.38 | 87.62 |
| 30 | 14.70 | 85.30 |
| 35 | 17.80 | 82.20 |
| 37.5 | 19.44 | 80.56 |

These compositions were all hot pressed at 1600° C. based on the results above.

The following tables 1C-1 through 1C-4 for samples A–D, respectively, shows that the hot pressed bodies with densities of 3.81–3.82 g/cm³ were annealed in a furnace at the following temperatures and times in a $N_2$ atmosphere.

TABLE 1C-1

Test matrix for hot-press/reactive annealing of AlON-Sample A, 26 mole % AlN

| Annealing Temperature (° C.) | Annealing Times (hrs) |
|---|---|
| 1700 | 1–2 |
| 1850 | 3–6 |
| 1950 | 3–6 |

TABLE 1C-2

Test matrix for hot-press/reactive annealing of AlON-Sample B 30 Mol % AlN

| Annealing Temperature (° C.) | Annealing Times (hrs) |
|---|---|
| 1700 | 1–2 |
| 1750 | 2–6 |
| 1850 | 2–6 |
| 1950 | 1–3 |

TABLE 1C-3

Text matrix for hot-press/reactive annealing of AlON-Sample C
35 Mol % AlN

| Annealing Temperature (° C.) | Annealing Times (hrs) |
|---|---|
| 1700 | 1–2 |
| 1850 | 3–6 |
| 1920 | 3–12 |
| 1950 | 3–6 |

TABLE 1C-4

Text matrix for hot-press/reactive annealing of AlON-Sample D
37.5 Mol % AlN

| Annealing Temperature (° C.) | Annealing Times (hrs) |
|---|---|
| 1700 | 1–2 |
| 1800 | 2–6 |
| 1850 | 3–6 |
| 1950 | 3–12 |

The results show that all the bodies were successfully reacted to form aluminum oxynitride as shown in tables 1D-1 through 1D-4 below.

The following table 1D-1 through 1D-4 shows that hot-press/reactive annealing for compositions in the range of 26 to 37.5 mole % AlN did result in forming an AlON phase. Tables 1D-1 through 1D-4 show the results of the annealing experiements. X-ray diffraction analysis verified the phase present to be AlON and microscopy determined the microstructure and grain size of the processed compacts.

TABLE 1D-1

Results of hot press/reactive anneal of 26 mol % AlN

| Temperature (° C.) | Time (hrs.) | Grain Size (μm) | AlON Phase |
|---|---|---|---|
| 1700 | 1–2 | <1 | Yes |
| 1850 | 3–6 | 5–10 | Yes |
| 1950 | 1–3 | 10–15 | yes |

TABLE 1D-2

Results of hot press/reactive anneal of 30 mol % AlN

| Temperature (° C.) | Time (hrs.) | Grain Size (μm) | AlON Phase |
|---|---|---|---|
| 1700 | 1–2 | <1 | Yes |
| 1750 | 2–6 | <1 | Yes |
| 1850 | 2–6 | 10–15 | yes |
| 1850 (1 atm) | 2–6 | 15–20 | yes |
| 1950 | 1–3 | 30–35 | yes |

TABLE 1D-3

Results of hot press/reactive anneal of 35 mol % AlN

| Temperature (° C.) | Time (hrs.) | Grain Size (μm) | AlON Phase |
|---|---|---|---|
| 1700 | 1–2 | <1 | Yes |
| 1850 | 3–6 | 1–5 | Yes |
| 1925 | 3–12 | 5–15 | yes |
| 1950 | 3–6 | 5–10 | yes |
| 1950 ($Al_2O_3$ setter powder) | 1–4 | 5–10 | yes |

TABLE 1D-4

Results of hot press/reactive anneal of 37.5 mol % AlN

| Temperature (° C.) | Time (hrs.) | Grain Size (μm) | AlON Phase |
|---|---|---|---|
| 1750 | 1–2 | <1 | Yes |
| 1850 | 3–6 | 5–10 | Yes |
| 1950 | 3–6 | 5–15 | yes |

The foregoing discussion discloses and describes embodiments of the present invention. One skilled in the art will readily recognize that the tables shown above are exemplary of the scope of the present invention and are not limited to the specific results obtained.

What is claimed is:

1. A method of making polycrystalline aluminum oxynitride comprising the steps of:
   mixing powders of alumina and aluminum nitride;
   forming a green body from the mixture;
   hot pressing the green body;
   reacting the hot pressed body; and
   cooling the reacted body, wherein the reacting step takes place at a temperature of from about 1700° C. to 2000° C., a pressure of from about 3 to 30,000 psi and a time of from about 1 to 12 hours.

2. A method of making single phase, polycrystalline aluminum oxynitride comprising the steps of:
   (a) mixing powders of $Al_2O_3$ and AlN;
   (b) forming a green body from the mixture;
   (c) compacting the green body by hot uniaxial pressing;
   (d) reacting the hot pressed body in an oxygen-free atmosphere; and
   (e) cooling to the reacted body to ambient temperature.

3. The method of claim 2, wherein the $Al_2O_3$ has a mole % range of from 60% to 74% of the powder mixture and the AlN has a mole % range of from about 26% to 40% of the powder mixture, and the resulting single phase, polycrystalline aluminum oxynitride produced from step (e) has the following chemical formula:

$$Al_{(64+x)/3} O_{32-x} N_x$$

where x is between 2 and 7.

4. The method of claim 2, wherein the powders are by mixed ball milling for 8 to 48 hours.

5. The method of claim 2, wherein the powders are mixed in a fluid medium and then dried.

6. The method of claim 5, wherein the fluid medium is selected from the group comprising methanol, ethanol and mixtures thereof.

7. The method of claim 2, wherein the mixing step (a) further comprises adding a reaction aid of equal to or less than 0.50 weight % of the powder mixture.

8. The method of claim 7, wherein the reaction aid is selected from the group comprising yttrium oxide, lanthanum oxide, and mixtures thereof.

9. The method of claim 2, wherein the compacting step (c) further comprises compacting the green body at a uniaxial pressing temperature of between 1350° C. and 1600° C., a uniaxial pressing pressure of between 3000 psi and 10,000 psi, and a uniaxial pressing time of between 1 and 4 hours.

10. The method of claim 9, wherein the reacting step (d) further comprises reacting the compacted green body at a temperature between 1700° C. and 2000° C., a pressure between 3 psi and 30,000 psi, and a time period of between 1 and 12 hours.

11. The method of claim 2, wherein the oxygen-free environment comprises flowing nitrogen.

12. The method of claim 2, wherein the polycrystalline aluminum oxynitride produced by step (d) has a density of between 2.56 and 3.82 grams/cm$^3$.

13. The method of claim 2, wherein the reacted body is cooled to ambient temperature at a rate of about 5° C. per minute.

14. A method of making polycrystalline aluminum oxynitride comprising the steps of:
(a) mixing powders of alumina and aluminum nitride;
(b) forming a green body from the mixture;
(c) compacting the green body at a uniaxial pressing temperature of between 1350° C. and 1600° C. a pressure of between 3000 psi and 10,000 psi, and a uniaxial pressing time of between 1 and 4 hours;
(d) reacting the hot pressed body; and
(e) cooling the reacted body to ambient temperature.

15. The method of claim 14, wherein the green body is compacted by hot uniaxial pressing at a pressure of about 3000 psi, a temperature of about 1600° C., and for a time period of about 2 hours.

16. The method of claim 14, wherein the Al$_2$O$_3$ has a mole % range of from 60% to 74% of the powder mixture and the AlN has a mole % range of from about 26% to 40% of the powder mixture and the single phase, aluminum oxynitride produced from step (e) has the following chemical formula:

$$Al_{(64+x)/3} O_{32-x} N_x$$

where x is between 2 and 7.

17. The method of claim 14, comprising mixing the powders by ball milling for 8 to 48 hours.

18. The method of claim 17, further comprising ball milling the powders in a fluid medium and drying the powders.

19. The method of claim 18, wherein said fluid medium is selected from a group comprising methanol, ethanol and mixtures thereof.

20. The method of claim 14, wherein the mixing step (a) further comprises adding a reaction aid of equal to or less than 0.50 weight % of the powder compositions.

21. The method of claim 20, wherein the reaction aid is selected from the group comprising yttrium oxide, lanthanum oxide, and mixtures thereof.

22. The method of claim 14, wherein the reacting step (d) further comprises reacting at a temperature between 1700° C. and 2000° C., a pressure between 3 psi and 30,000 psi, and a time period of between 1 and 12 hours.

23. The method of claim 22, wherein the reacting step (d) occurs in an oxygen-free environment comprising flowing nitrogen.

24. The method of claim 14, wherein the polycrystalline aluminum oxynitride has a density of between 2.56 and 3.82 grams/cm$^3$.

25. The method of claim 14, wherein the hot pressed body is cooled to ambient temperature at a rate of about 5° C. per minute.

* * * * *